(12) United States Patent
Gezault et al.

(10) Patent No.: US 10,197,103 B2
(45) Date of Patent: Feb. 5, 2019

(54) SEALING ARRANGEMENT

(71) Applicants: Alain Gezault, Vineuil (FR); Juergen Kurth, Odenthal (DE)

(72) Inventors: Alain Gezault, Vineuil (FR); Juergen Kurth, Odenthal (DE)

(73) Assignee: Aktiebolaget SKF, Göteborg (SE)

( * ) Notice: Subject to any disclaimer, the term of this patent is extended or adjusted under 35 U.S.C. 154(b) by 440 days.

(21) Appl. No.: 15/003,889

(22) Filed: Jan. 22, 2016

(65) Prior Publication Data

US 2016/0215824 A1 Jul. 28, 2016

(30) Foreign Application Priority Data

Jan. 26, 2015 (EP) .................................... 15152527

(51) Int. Cl.
*F16J 15/34* (2006.01)
*F16C 41/00* (2006.01)
(Continued)

(52) U.S. Cl.
CPC ............ *F16C 41/002* (2013.01); *F16C 33/78* (2013.01); *F16C 33/7823* (2013.01); *F16C 33/7896* (2013.01); *F16J 15/064* (2013.01); *F16J 15/3204* (2013.01); *F16J 15/328* (2013.01); *F16J 15/3284* (2013.01); *F16C 33/7856* (2013.01); *F16C 33/7876* (2013.01); *F16C 2202/32* (2013.01)

(58) Field of Classification Search
CPC ............................ F16J 15/3204; F16J 15/3232
See application file for complete search history.

(56) References Cited

U.S. PATENT DOCUMENTS

| 4,550,920 A | * | 11/1985 | Matsushima | ........ | F16J 15/3244 |
| | | | | | 277/559 |
| 4,995,623 A | * | 2/1991 | Wada | ...................... | F16F 9/364 |
| | | | | | 188/322.17 |

(Continued)

FOREIGN PATENT DOCUMENTS

| DE | 29916854 U1 | 1/2000 |
| EP | 2290269 A1 | 3/2011 |

(Continued)

*Primary Examiner* — Vishal A Patel
(74) *Attorney, Agent, or Firm* — Bryan Peckjian; SKF USA Inc. Patent Dept.

(57) ABSTRACT

A sealing arrangement for sealing a first chamber against a second chamber, the sealing arrangement being located between a first machine element and a second machine element. A relative movement occurs between the two machine elements. The sealing arrangement comprises a sealing element which is equipped with at least one sealing lip. The sealing lip(s) is/are held by the sealing element and is/are fixed by the sealing element at one of the machine elements. The sealing lip(s) is/are in sliding contact with the other machine element. The sealing arrangement comprises a lip element that is fixed with one of the machine elements and is in sliding contact with the other machine element. The lip element comprises a conductive element for establishing electrical conductivity of the lip element, so that electrical conductivity is established between the two machine elements by the lip element in an effective an economical manner.

10 Claims, 2 Drawing Sheets

(51) Int. Cl.
　　　*F16C 33/78*　　　(2006.01)
　　　*F16J 15/06*　　　(2006.01)
　　　*F16J 15/3284*　　(2016.01)
　　　*F16J 15/3204*　　(2016.01)
　　　*F16J 15/328*　　 (2016.01)

(56) References Cited

U.S. PATENT DOCUMENTS

| | | | | |
|---|---|---|---|---|
| 6,102,409 | A * | 8/2000 | Furuyama | F16J 15/3228 |
| | | | | 277/559 |
| 7,658,387 | B2 * | 2/2010 | Park | F16J 15/3244 |
| | | | | 277/559 |
| 9,062,773 | B2 * | 6/2015 | Sedlar | F16J 15/3244 |
| 9,394,998 | B2 * | 7/2016 | Hatch | F16J 15/3232 |
| 2007/0138748 | A1 * | 6/2007 | Orlowski | F16J 15/4478 |
| | | | | 277/412 |
| 2010/0276894 | A1 * | 11/2010 | Jin | B60L 11/00 |
| | | | | 277/500 |
| 2012/0267858 | A1 * | 10/2012 | Rust | F16J 15/064 |
| | | | | 277/321 |
| 2014/0203514 | A1 * | 7/2014 | Colineau | F16J 15/002 |
| | | | | 277/353 |

FOREIGN PATENT DOCUMENTS

| | | |
|---|---|---|
| EP | 2301766 A1 | 3/2011 |
| JP | 2006275231 A | 10/2006 |

\* cited by examiner

SEALING ARRANGEMENT

CROSS REFERENCE TO RELATED APPLICATION

This is a Non-Provisional patent application, filed under the Paris Convention, claiming the benefit of Europe (EP) Patent Application Number 15152527.6, filed on 26 Jan. 2015 (26.01.2015), which is incorporated herein by reference in its entirety.

TECHNICAL FIELD OF THE INVENTION

The invention relates to a sealing arrangement for sealing a first chamber against a second chamber, which is arranged between a first machine element and a second machine element, wherein a relative movement occurs between the two machine elements, wherein the sealing arrangement comprises a sealing element which is equipped with at least one sealing lip, wherein the at least one sealing lip is held by the sealing element and is fixed by the sealing element at one of the machine elements and wherein the at least one sealing lip is in sliding contact with the other machine element.

BACKGROUND OF THE INVENTION

In the bearing technology it is known that bearings are provided so that an electrical current can pass through the bearing elements. If this is allowed with no specific provisions there is the danger that sparks are created between the bearing rings and the rolling elements due to the transfer of the current. Detrimentally, the sparks create craters on the rolling elements and bearing ring raceways which lead to bearing failure.

To avoid the creation of sparks different measures are known. One possibility is to insulate the bearing rings, e.g. with a cover of ceramic material. By doing so no current transfer can occur through the bearing. Also electrical non-conductive rolling elements can be employed, specifically made of a ceramic material. Both mentioned measures are quite cost intensive. Also the use of an electrically conductive grease for lubrication can be taken into account. This approach is not always fully satisfactory.

Also, special coal brushes are known to establish electrical conductivity between the bearing rings. But also this approach is quite cost intensive. Also, for doing so sufficient mounting space is required which is not available in all cases.

Thus, it is an object of the present invention to develop a sealing arrangement of the generic kind which prevents the current flow between the bearing rings and the rolling elements in an effective manner and in a cost-efficient way. That is, an electrical conductivity should be established between the two machine elements in an effective and economical manner.

SUMMARY OF THE INVENTION

The solution of this object by the invention is characterized in that the sealing arrangement comprises a lip element which is fixed with one of the machine elements and which is in sliding contact with the other machine element, wherein the lip element comprises means for establishing electrical conductivity of the lip element, so that electrical conductivity is established between the two machine elements by the lip element.

The lip element and at least one of the sealing lips of the sealing element can be identical, i.e. the same machine part.

Alternatively, the lip element can be an additional element beside the sealing element with its at least one sealing lip. In this case the lip element can be arranged at an axial end of the sealing arrangement. The lip element can comprise a reinforcement ring which is at least partially coated or covered by the material which forms the lip element.

Furthermore, the lip element can comprise a lip section which is in sliding contact with the other machine element, wherein the lip section comprises at least one recess along its circumference; thereby, a plurality of recesses can be arranged along the circumference of the lip section, preferably equidistantly around the circumference.

The lip element can consist of an elastic material and can be provided with at least one layer of an electrical conductive material. The layer can consist of carbon.

The at least one layer is preferably applied by means of the ion beam technology.

The present invention is preferably used in connection with a roller bearing. Thus, a preferred embodiment proposes that the described sealing arrangement is mounted in a rolling bearing between the bearing rings.

Thus, by the proposed measures a sealing arrangement is provided which permits the electrical current leakage. The flow of an electrical current can be avoided through the bearing in an easy and cost effective way. An isolation of the bearing rings or the use of ceramic rolling elements is not necessary.

For the lip element which provides the electrical conductivity different elastomere materials can be used (for example NBR, HNBR, ACM, FKM, EPDM, RE3) on which a thin layer of carbon or conducting metal is deposited preferably by the ion beam technology. Then, the electrical current can pass through the bearing by the rings and the lip element (contacted seal) and not through the rolling elements. Thus, to have a lip element (conducting seal) in contact with the bearing rings allows the electric current to pass by them instead of between the rings and the rolling elements.

In case of a negative impact on the sealing performance by the coated sealing edge (sealing lip) a separate coated elastomere element with a very flexible lip segments (lip section) can be placed in front to a main seal. In this case the conductive contacts are protected against grease or oil ingress.

Beneficially, the flow of an electrical current through the bearing is prevented. The costs for doing so are lower compared with the pre-known ceramic coating. Also a higher bearing life is obtained.

A further benefit is that the proposed solution is also effective when used in an application with very high frequency current. This is not the case with respect to the pre-known solution with a ceramic isolation of the bearing rings.

The proposed solution can be used in all application where electrical current could pass through the bearing, such as railways, electrical motors and applications with high frequency current.

BRIEF DESCRIPTION OF THE DRAWINGS

In the drawings an embodiment of the invention is depicted.

DETAILED DESCRIPTION OF SOME EMBODIMENTS

Figure 1:
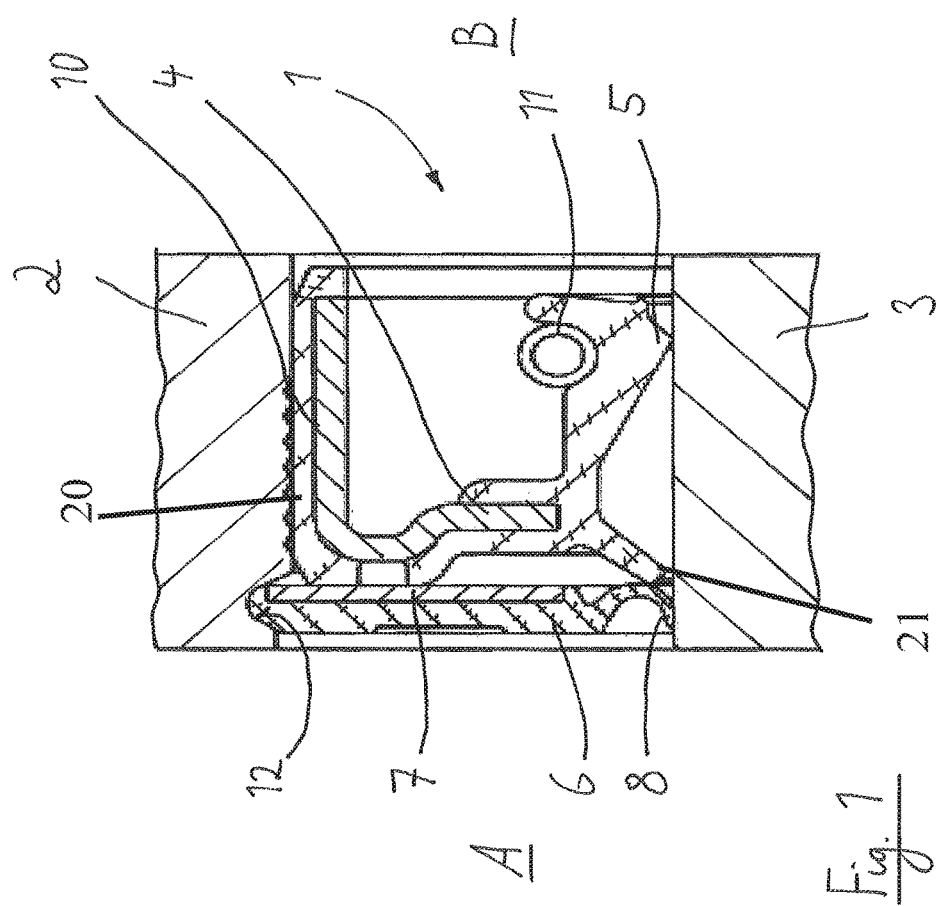
FIG. 1 shows a radial cross section of a sealing arrangement which is arranged between two machine element.

In the figures a sealing arrangement 1 is shown. The arrangement is mounted between a first machine element 2 and a second machine element 3 to seal a first chamber A against a second chamber B. The first chamber A can be a chamber in which a lubricant is located; the second chamber B can be the environment. Typically such a sealing arrangement 1 is mounted at an axial end of a roller bearing to seal the space where the roller elements are located. Insofar, the first machine element 2 can be a bearing outer ring while the second machine element 3 can be a bearing inner ring.

The sealing arrangement 1 has a sealing element 4. This well-known element is basically a sealing base element which comprises a mounting region 10 by which the sealing arrangement 1 is fixed at one of the two machine elements 2. The sealing element extends radially against the other machine element 3 and is provided there with a first sealing element lip 5 which is in (direct or indirect) sliding contact with the machine element 3, a second sealing element lip 21 which is not in contact with the machine element 3, and an axially extending sleeve section 20 which is abuttingly secured against the machine element 2. A spring element 11 biases the sealing lip 5 against the surface of the machine element 3 to ensure proper sealing.

Essentially, the sealing arrangement 1 comprises furthermore a lip element 6 which is fixed with the machine element 2 and which is in sliding contact with the machine element 3. The lip element 6 comprises means for establishing electrical conductivity of the lip element (not visible), so that electrical conductivity is established between the two machine elements 2 and 3 by the lip element 6.

The lip element 6 consists of an elastomere material but is stabilized by a reinforcement ring 7 in the case of the depicted embodiment. Specifically, the lip element 6 comprises a lip section 8 with a flexible lip which contacts the machine element 3. A reinforcement ring 7 is disposed between the sealing element 4 and the lip element 6 such that the only contact between the sealing element 4 and the lip element 6 is contact between the second sealing element lip 21 of the sealing element 4 and the lip section 8 of the lip element 6, the second sealing element lip 21 extending obliquely toward the second machine element 3 and being spaced from the second machine element 3 since it contacts the lip element 6 at a radial distance from the second machine element 3.

For the mounting of the lip element 6 a groove 12 is machined in the machine element 2 in which the ring shaped lip element 6 can be clipped or snapped.

The lip element 6 is coated with a layer of electrical conductive material along its whole radial extension, which is a layer of carbon in the present case. This layer is applied by means of the ion beam technology which is well known as such.

Figure 2:
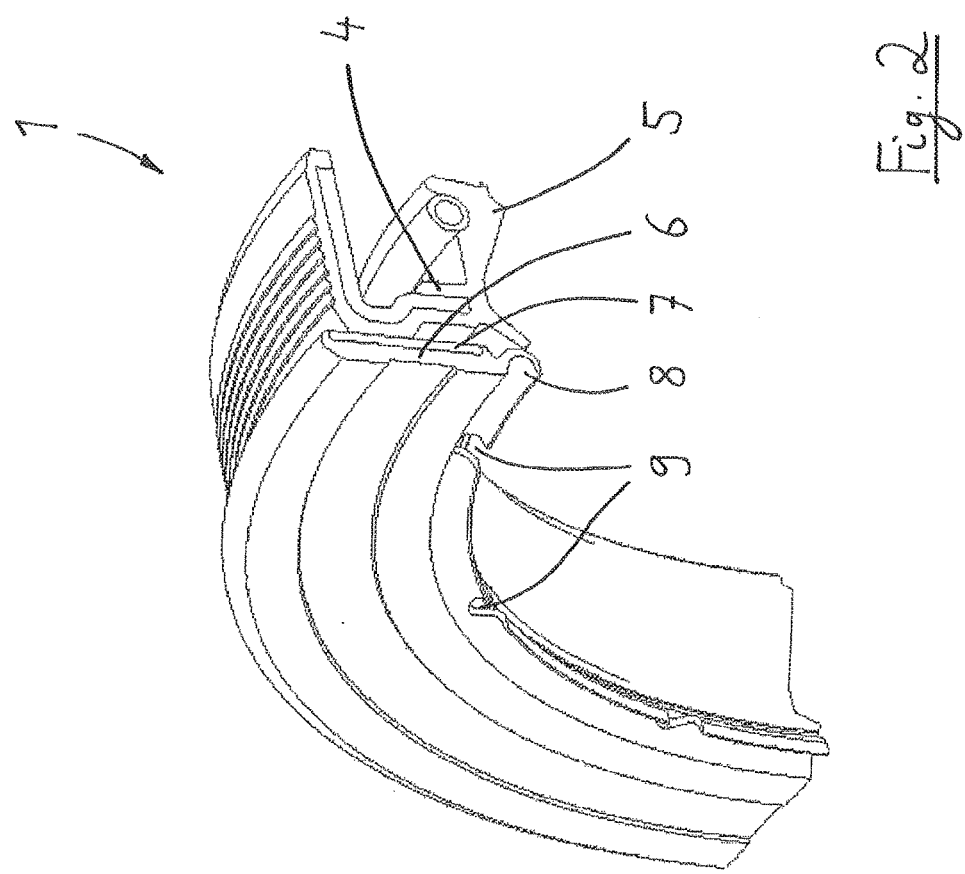
FIG. 2 shows a perspective view of the sealing arrangement, wherein a part of the arrangement is shown in a partial cross section.

As can be seen from FIG. 2 a plurality of recesses 9 is arranged around the circumference of the lip section 8. This ensures that at the one hand sufficient contact is given between the lip section 8 and the machine element 3 so that an electrical contact is established, but that on the other hand no relevant friction torque occurs due to the lip element 6. This element is in the present embodiment a separate part which is mounted—as depicted—at an axial end of the sealing arrangement 1 and is insofar a part of the same.

LIST OF REFERENCES

1 Sealing arrangement
2 First machine element
3 Second machine element
4 Sealing element
5 Sealing lip
6 Lip element
7 Reinforcement ring
8 Lip section
9 Recess
10 Mounting region
11 Spring element
12 Groove
A First chamber (oil region)
B Second chamber (environment)

What is claimed is:

1. A sealing arrangement for sealing a first chamber against a second chamber, which is arranged between a first machine element and a second machine element, wherein a relative movement occurs between the the first machine element and the second machine element, the sealing arrangement comprising:
    a sealing element which has a first sealing element lip, a second sealing element lip, and an axially extending sleeve section,
    wherein the axially extending sleeve section is abuttingly secured against the first machine element,
    wherein the first sealing element lip is in sliding contact with the second machine element,
    a lip element contacts both the first machine element and the second machine element, the lip element having a lip section, the lip element is fixedly secured to the first machine element, the lip section of the lip element is in sliding contact with the second machine element,
    a reinforcement ring is disposed between the sealing element and the lip element such that the only contact between the sealing element and the lip element is contact between the second sealing element lip of the sealing element and the lip section of the lip element, the second sealing element lip extending obliquely toward the second machine element and being spaced from the second machine element since it contacts the lip element at a radial distance from the second machine element, an outer diameter of the reinforcement ring is larger than an outer diameter of the axially extending sleeve section
    the lip element further comprising a conductive element for establishing electrical conductivity of the lip element, so that electrical conductivity is established between the first machine element and the second machine element by the lip element.

2. The sealing arrangement according to claim 1, wherein the lip element is an additional element beside the sealing element.

3. The sealing arrangement according to claim 2, wherein the lip element is arranged at an axial end of the sealing arrangement.

4. The sealing arrangement according to claim 2, wherein the reinforcement ring, when viewed in cross section, has first and second longitudinal ends and first and second radially extending axial surfaces extending therebetween, at least one of the first and second longitudinal ends and at least one of the first and second radially extending axial surfaces is overlapped and in contact with the lip element.

5. The sealing arrangement according to claim 2, wherein the lip section comprises at least one recess along a circumference of the lip section.

6. The sealing arrangement according to claim 2, further comprising a plurality of recesses arranged equidistantly along a circumference of the lip section.

7. The sealing arrangement according to claim 1, wherein the lip section defines a plurality of recesses along a circumference thereof.

8. The sealing arrangement according to claim 1, the lip element further comprising an elastic material and is provided with at least one layer of an electrical conductive material.

9. The sealing arrangement according to claim 8, wherein the at least one layer consists of carbon.

10. The sealing arrangement according to claim 8, wherein the at least one layer is applied by ion beam technology.

* * * * *